INVENTORS
IAN C. TWILLEY
WILLIAM N. RUSSELL
WELDON H. PETERSON

ATTORNEY

United States Patent Office 3,579,483
Patented May 18, 1971

3,579,483
ε-CAPROLACTAM CONTINUOUS POLYMERIZATION PROCESS
Ian C. Twilley, Chester, and William N. Russell and Weldon H. Peterson, Colonial Heights, Va., assignors to Allied Chemical Corporation, New York, N.Y.
Filed Apr. 15, 1969, Ser. No. 816,286
Int. Cl. C08g 20/14, 20/42
U.S. Cl. 260—78
11 Claims

ABSTRACT OF THE DISCLOSURE

Apparatus and process for continuous polymerization of polyamides to produce a polymer wherein the required viscosity can be obtained much more rapidly and the extent of polymerization far greater than heretofore possible by use of a vacuum demoisturizing column within the polymerization train wherein the pre-polymer is converted to polyamide of higher molecular weight in a short period of time by exposing at least about 0.2 square foot of pre-polymer per pound thereof to a temperature of between about 230° C. and about 300° C. at pressures of less than about 500 mm. Hg. The apparatus and process yields even greater efficiencies when used in conjunction with polyamidation catalysts.

BACKGROUND OF THE INVENTION

This invention relates to an improved apparatus and process for polymerizing polyamides. More particularly it relates to an improved apparatus and process for polymerizing polyamide precursors wherein the desired viscosity can be obtained much more rapidly and the extent of polymerization far greater than heretofore possible by the use of a demoisturizing vacuum column within the polymerization train. Still more particularly it relates to an improved apparatus and process for continuously or semi-continuously polymerizing polyamide precursors wherein the desired viscosity can be obtained much more rapidly and the extent of polymerization far greater than heretofore possible by the use of a demoisturizing vacuum column within the polymerization train in conjunction with the use of certain polyamidation catalysts.

The present apparatus and process allows producing continuously or semi-continuously polyamides of high quality and uniformity much more rapidly than heretofore possible and of substantially any degree of polymerization desired corresponding to formic acid relative viscosity (F.A.R.V.) as described in U.S. Pat. 3,294,756.

The most generally employed method for the preparation of polyamides involves the polymerization of polyamide precursors in the presence of water which serves to initiate the polymerization at temperatures between about 180° C. and 300° C. and a water pressure of at least about 25 p.s.i.a., whereby low molecular weight polyamide containing water is formed, then releasing the pressure and continuing the polymerization under conditions allowing the diffusing and evaporation of water from the polyamide as polymerization progresses. It is well known that in the final stages of the polymerization the rate and extent of polymerization is limited by the rate of diffusion of the products of reaction; and in the case of polycondensation, it is usually water from the melt. As it is critical to eliminate as rapidly as possible substantially all volatiles to successfully carry out the polycondensation process, as well as, obtain a high quality polymer, it is highly desirable to impart a high surface area to the reaction mixture to assist in increasing the overall efficiency of the process. However, such imparting of high surface area to the reaction mixture at this stage of the polymerization tends to require large and bulky equipment as well as a rather slow flow rate in order to make sure substantially all the volatiles are removed and a high quality polymer is prepared.

SUMMARY OF THE INVENTION

It is, therefore, a primary object of this invention to provide a new and novel apparatus and process for the manufacture of synthetic polymers.

Another object of this invention is to provide a new and novel apparatus and process for preparing synthetic polymers, such as polyamides, and particularly those having fiber and film forming properties.

Still another object of this invention is to provide a new and novel apparatus and process for preparing polyamide polymers continuously or semi-continuously of high quality and uniformity much more rapidly than heretofore possible and of substantially any degree of polymerization desired.

A further object of this invention provides a new and novel apparatus and process for forming high quality and uniform synthetic polymers such as polyamides which is characterized by increased capacity in the preparation of higher molecular weight polymers in a given time.

Another object of the invention is to provide a new and novel apparatus and process for making synthetic polymers which permit greater extent of polymerization and capacity by exposing said polymerization reaction mixture to a vacuum demoisturizing environment thereby rapidly reducing the concentration of the volatiles, and particularly water.

Other objects and advantages of the invention will become apparent from the following description thereof taken in connection with the accompanying drawings.

The objects of the invention are accomplished by an apparatus and process for the polymerization of fiber forming polyamide comprising polymerization means for carrying out the polymerization at an elevated temperature in the presence of water and terminating agents to form a polyamide polymerization reaction mixture, extruding means to impart a predetermined surface area to the reaction mixture of at least about 0.2 square foot of pre-polymer per pound thereof, and a demoisturizing vacuum evaporative environment means wherein the temperature is maintained between about 230° C. and about 300° C. and at a pressure at which the rate of polymerization is no longer limited by the mass transfer process and less than about 500 mm. Hg.

Our apparatus and process comprises forming a terminated polyamide by hydrolytic polymerization by use of a demoisturizing vacuum column within the polymerization train wherein the pre-polymer is converted to polyamide of higher molecular weight either with or without a catalyst. The initial stage of the present process is generally performed using conventional means such as an autoclave or other reaction vessel capable of containing a closed system. The reactants are generally charged to the reaction vessel and polymerization commenced at an initial water vapor pressure of at least about 20–30 p.s.i.a. Temperatures employed generally range from about 180° C. to about 300° C. The resultant reaction mixture includes water, a catalyst if desired, unreacted monomer and relatively low molecular weight polyamide. This reaction mixture is then transferred in molten form to an apparatus wherein the surface area of the reaction mixture is increased to expose at least about 0.2 square foot of pre-polymer per pound thereof to a demoisturizing vacuum condition at elevated temperature and sub-atmospheric pressure to remove water and other volatile materials. This results in a substantial acceleration of the rate of polymerization of the reaction mixture. The use of catalysts in the process in conjunction with these evaporative conditions further enhances the rate of polymerization.

Suitable catalysts for use in the present invention are hypophosphorus acid, phosphoric acid and derivatives of hypophosphorus acid, such as, alkali metal salts of hypophosphorus acid, alkaline earth metal salts of hypophosphorus and ammonium hypophosphite. These catalysts are used effectively only in very small amounts and in the range of about 0.002 mole percent and about 0.03 mole percent. Preferred amounts used are in the range of about 0.005 mole percent and about 0.01 mole percent. Any polycondensation type catalyst would be satisfactory, however, those enunciated above are preferable.

The evaporative vacuum environment comprises a vessel with generally cylindrical interior having its long axis substantially vertical and wherein its dimensions provide sufficient space to allow the strands upon their entrance thereinto to be subjected to the demoisturizing vacuum environment for such time wherein substantially all reaction products the absence of which will promote polymerization are removed. The temperature of the vessel is maintained by conventional temperature control means and said vessel has an inlet and outlet aperture at opposite ends of said vessel with the inlet aperture being located at the top thereof. A die plate is located within said inlet aperture and so positioned wherein material entering said vessel passes therethrough. The vacuum means can be positioned in the wall of said vessel adjacent said inlet means; however, they can be positioned otherwise so long as they create the demoisturizing environment as heretofore defined. One or more baffles or entrainment separator means are positioned between said vacuum means and said die plate, and wherein multiple baffles are used said baffles can each be different in length and each baffle other than the innermost and outermost one is preferably foraminous. A plug flow chamber is located within said vessel from said outlet aperture to an upper point within said vessel wherein said plug flow of the material can be retained or held up for a period of time sufficient to remove all reaction products, the absence of which will promote polymerization. The vacuum chamber located between said inlet aperture and said plug flow chamber has dimensions sufficient in breadth and length wherein substantially all the volatiles are removed from the extruded material. A venting aperture is located near said outlet aperture wherein said vessel is vented and flushed.

The apparatus wherein the surface area of the reaction mixture is increased to expose at least about 0.2 square foot of pre-polymer per pound thereof to an evaporative environment is an extrusion apparatus wherein the reaction mixture can be formed into continuous or non-continuous strands, films, ribbon particles and the like. Preferably, the surface area of the reaction mixture is increased by extrusion through a die plate to form a strand having a calculated exposed surface area of about 2 to about 200 square feet of pre-polymer per pound.

The evaporative environment comprises conditions of about 230° C. to about 300° C. temperature and not more than about 500 mm. Hg pressure and with a residence time between about 30 and 180 minutes. Preferably, however, the temperature and pressure within the evaporative environment are maintained between about 250° C.–285° C. and between about 50 mm. Hg and about 250 mm. Hg, respectively with residence time being between about 60 and 120 minutes. During this residence time, substantially all water is removed.

An especially preferred method for treating the reaction mixture according to the present invention comprises extruding the reaction mixture through a die plate, preferably into a plurality of continuous or non-continuous strands and allowing the strands so formed to descend or fall freely through an evaporative demoisturizing environment for a period of time at least sufficient to remove all reaction products, the absence of which will promote polymerization. The strands descend in this manner for a distance of at least about 4 feet and preferably from between about 6 feet and about 20 feet and then accumulate in a pool which occupies the lower portion of the evaporative environment. The reactive material is withdrawn from the pool at the bottom thereof so as to establish and maintain a condition of substantially plug flow therein. During the initial stage of the process when pre-polymer is being formed, chain terminators and various other additives, if desired, are included into the reaction mixture. The apparatus and process of this invention are applicable to terminated or non-terminated polymers, through the preparation of terminated polymers is preferred. Where terminated polymers are being prepared, the terminal amino groups and especially the terminal carboxyl groups of the polyamide chain can be terminated or capped by adding into the initial reaction mixture either a monoamine or a diamine of at least 6 carbon atoms with aralkyl monoamines and aralkyl diamines being preferred. Suitable amines for use in the present invention are m-xylylenediamine, benzylamine, 4,4'-diaminomethylbiphenyl, β-aminomethylnaphthalene, 1-5 - diaminomethylnaphthalene and the like.

Substances useful for capping the terminal amino groups of polyamides of the present invention are of the type described in U.S. Pat. 3,386,967. Such chain terminators include aliphatic, alicyclic, aromatic, and heterochain dicarboxylic acids having at least about 5 carbon atoms per molecule and preferably between about 6 and about 20 carbon atoms per molecule. Examples of dicarboxylic acids suitable for use in this invention are:

(1) Aliphatic dicarboxylic acids adipic acid
    hexa-3-enedioic acid
    pimelic acid
    suberic acid
    azelaic acid
    sebacic acid
    undecanedioic acid
    dodecanedioic acid
    tetradecanedioic acid (2) Alicyclic dicarboxylic acids cyclohexane-1,4-dicarboxylic acid
cyclohexa-2,5-diene-1,4-dicarboxylic acid
Decalin-2,6-dicarboxylic acid
bicyclohexyl-4,4'-dicarboxylic acid (3) Aromatic dicarboxylic acids tetraphthalic acid
naphthalene-1,5-dicarboxylic acid (4) Heterochain dicarboxylic acids ethylene glycol-bis-carboxymethyl ether The dicarboxylic acid can also contain seubstituent groups provided such groups do not react with amino or carboxyl groups in the course of the polymerization reaction or hinder the reactivity of the dicarboxylic acid toward the amino end-groups of the polyamide. Examples of such substituents include lower alkyl groups, ether groups and the like. Also, the dicarboxylic acid must be thermally stable and non-voliatile under polymerization conditions. Similarly, reactive derivatives of dicarboxylic acids, e.g., monoesters, diesters, dibasic acid anhydrides, and the like are also suitable for terminating amino end-groups of the polyamides of the present invention.

In the polymerization of epsilon-caprolactam, dicarboxylic acid terminating agents suitable for use are preferably employed in amounts of between about 0.1 and about 0.7 mole per hundred moles of monomer and more preferably between about 0.2 and about 0.4 mole per 100 moles of monomer. The amount of dicarboxylic acid employed determines to a large extent the molecular weight of the polyamide and the proportion of end-groups. Thus, as disclosed in the above cited U.S. Pat. 3,386,967, the use of about 0.1 mole of dicarboxylic acid per 100 moles of $\epsilon$-caprolactam generally results in a polyamide having a number average molecular weight of tbout 15,000 and containing about 20 gram equivalents of amino end-groups per milliter of polymer. The use of a dicarboxylic acid within the preferred range of between about 0.2 mole and about 0.4 mole per 100 moles of $\epsilon$-caprolactam will afford a polyamide having a number average molecular weight of between about 25,000 and about 40,000 which corresponds to a formic acid relative viscosity of about 60 to 90. Such a polyamide will contain less than about 10 equivalents of amino end-groups per milliliter of polymer.

The number of equivalents of amino end-groups and carboxyl end-groups per millier of polymer are determined by chemical analysis. Thus, amino end-groups are analyzed by dissolving a weighed polymer sample in m-cresol and titrating with a methanolic solution of p-toluenesulfonic acid to the thymol blue end-point. Likewise, carboxyl end-groups are analyzed by dissolving a weighed polymer sample in benzyl alcohol and titrating with a solution of sodium hydroxide in benzyl alcohol to the phenolphthalein end-point.

In addition to chain-terminating agents, other property-modifying ingredients can be incorporated into the polyamide in any desired amount. Examples of such additives include fire-retarding agents such as, antimony, phosphorus, and halogen compounds; delustrants, such as, titanium dioxide; antistatic agents; adhesion promoting agents, such as, isocyanates and epoxides; heat and light stabilizers, such as, inorganic reducing ions; transition metal ions, such as, $Mn^{+2}$, $Cu^{+2}$; $Sn^{+2}$; phosphites; organic amines, such as, alkylated aromatic amines and ketone aromatic amine condensates; thermally stable pigments; fluorescing agents and brighteners; latent cross-linking agents; bacteriostats, such as, phenols and quaternary amines; colloidal reinforcing particles; antisoiling agents and the like. These additives can be incorporated into the polymer at any stage of the reaction, whether as concentrates distributed in the monomer or in preformed polyamide, or as pure ingredients. For operational efficiency, however, the additives are preferably introduced together with the chain-terminating agent at the commencement of the process. Proper dispersion of these ingredients within the polymer is achieved by means conventional in the polymerization art.

The novel features which are believed to be characteristic of the invention are set forth with particularity in the appended claims. The invention, both as to its organization and method of operation, may be best understood by reference to the following description taken in conjunction with the accompanying drawing in which:

Figure 1:
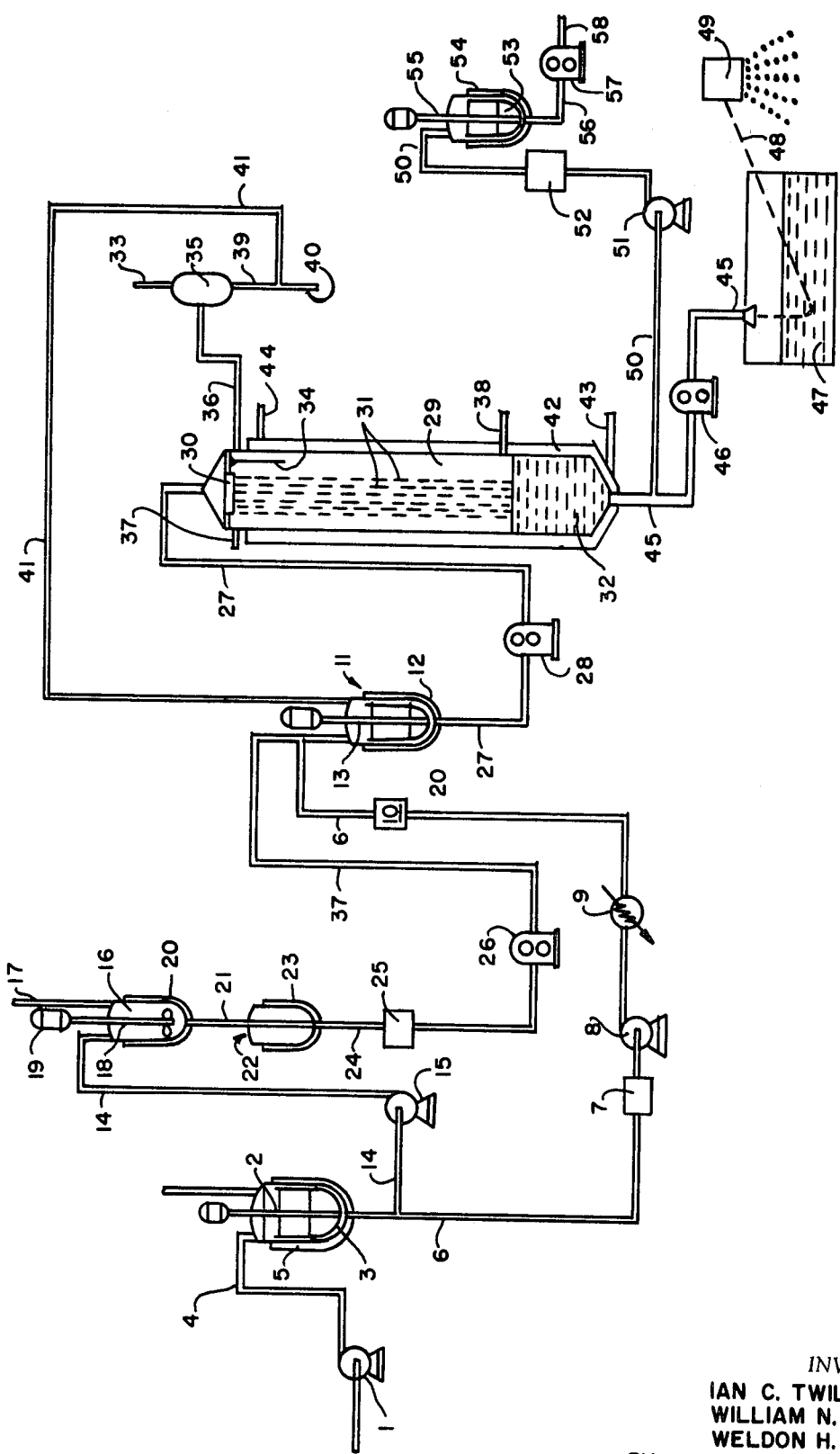
FIG. 1 is a flow chart or diagram illustrating a polymerization process carried out in accordance with the invention.

With reference to FIG. 1, molten lactam feed pump 1 is shown connected to lactam holding tank 3 by means of supply line 4. The temperature necessary to keep the lactam within holding tank 3 in a liquid state is maintained by any suitable means. For example, heating jacket 5 can be used to provide external heating by well known means, such as steam, etc. Temperature gradients within lactam holding tank 3 are minimized and controlled by providing suitable agitation, such as, by means of a conventional motor-driven stirrer 2.

The lactam in holding tank 3 is then transferred, via line 6, through, successively, filter 7, pump 8, flowmeter 9, preheater 10, and finally into reactor 11. Filter 7 can be adapted to employ any suitable filtration medium such as cotton, wood, wood pulp and the like. Further, multiple filters can be used if desired. Flowmeter 9 can be any appropriate flow-monitoring device, such as a flow-responsive turbine. A plurality of flowmeters can be used or can be combined with a pump so that the resulting metering pump can be substituted for pump 8 and flowmeter 9.

Reactor 11 is an autoclave which can be heated by any suitable means, such as, electric heating coils or a liquid filled heating jacket 12 similar to heating jacket 5 in lactam holding tank 3. The reaction mixture within reactor 11 can be agitated into a conventional manner, such as, by means of motor-driven stirrer 13.

An intermittent side stream of lactam is taken from lactam holding tank 3 through line 14 and transferred to additives mixing tank 16 by means of pump 15. When additives mixing tank 16 is filled with a measured amount of lactam, calculated quantities of chain terminator and other additives, if desired, are added through line 17. Mixing is provided by a conventional means such as by agitator 18 driven by motor 19. The materials within additives mixing tank 16 are maintained in a fluid state by conventional heating methods, such as, by means of heating jacket 20. The homogeneous mixture of lactam and additives is then transferred from mixing tank 16 through line 21 to storage tank 22. This transfer can be aided by mechanical pumping means or by gravity flow, as shown. Fluidity within storage tank 22 is maintained by conventional heating means, such as, by heating jacket 23.

From storage tank 22, the lactam-additives mixture is transferred, by means of line 24, through, successively, filter 25 and metering pump 26 to a point in main lactam feed line 6 between preheater 10 and reactor 11.

From reactor 11, the reaction mixture or pre-polymer which comprises low molecular weight polyamide, additives, unreacted lactam, and water, is pumped through line 27 by metering pump 28 to vacuum demoisturizer 29. The pre-polymer enters vacuum demoisturizer 29 through formainous die plate 30 in the form of continuous or noncontinuous strands 31 which descend through the interior of vacuum demoisturizer 29 to form a pool of polymer melt 32 at the bottom of the vacuum demoisturizer 29. A vacuum is maintained within vacuum demoisturizer 29 by means of a vacuum pump, not shown, which communciates with the vacuum demoisturizer 29 through vacuum lines 33 and 36 via condenser 35. An alternate vacuum system communicates with vacuum demoisturizer 29 through vacuum line 37, associated alternate vacuum pump not shown. Inert gas can be introduced into vacuum demoisturizer 29 through bleed line 38 for venting and flushing purposes.

Foaming occurs on the surface of strands 31 and volatile materials, such as, water and unreacted lactam, are withdrawn from vacuum demoisturizer 29 through line 36. Baffle plates or entrainment separator means 34 are positioned within vacuum demoisturizer 29 between falling strands 31 and the juncture of line 36 with the wall of the demoisturizer. The purpose of the baffle plates or entrainment separator means 34 is to prevent strands 31 from being sucked into line 36. The volatile materials passing through line 36 are liquified in condenser 35. The water is disposed of through line 40 and lactam is carried through line 41 and recycled to reactor 11.

Vacuum demoisturizer 29 can be heated by conventional means, such as electric heating coils disposed within the vacuum demoisturizer 29 and/or by means of a heating jacket 42 surrounding vacuum demoisturizer 29 as shown. A conventional heat-transfer liquid, such as, Dowtherm, can be circulated through heating jacket 42 by entering the jacket at inlet 43 and exiting at outlet 44.

Molten polymer is withdrawn from pool 32 at the bottom of vacuum demoisturizer 29 through line 45 with the aid of pump 46 and transferred to quench bath 47 containing a conventinal quenching medium, such as, water. From quench bath 47, the now solid polymer 48 is transferred to pelletizer 49.

An additional or alternate route for further processing can be utilized by withdrawing the molten polymer from pool 32 at the bottom of demoisturizer 29 through line 45 and alternate line 50 by transfer pump 51 with appropriate valving means, not shown. The polymer can go through a preheater 52, if necessary, and then into reactor 53 which can be heated by conventional means, such as a heating jacket 54 and agitated by conventional means, such as, stirrer 55. The polymer can then be sent to subsequent processing means such as further finishing or direct spinning if desired by withdrawing the polymer through line 56 by metering pump 57 and out through line 58.

Figure 2:
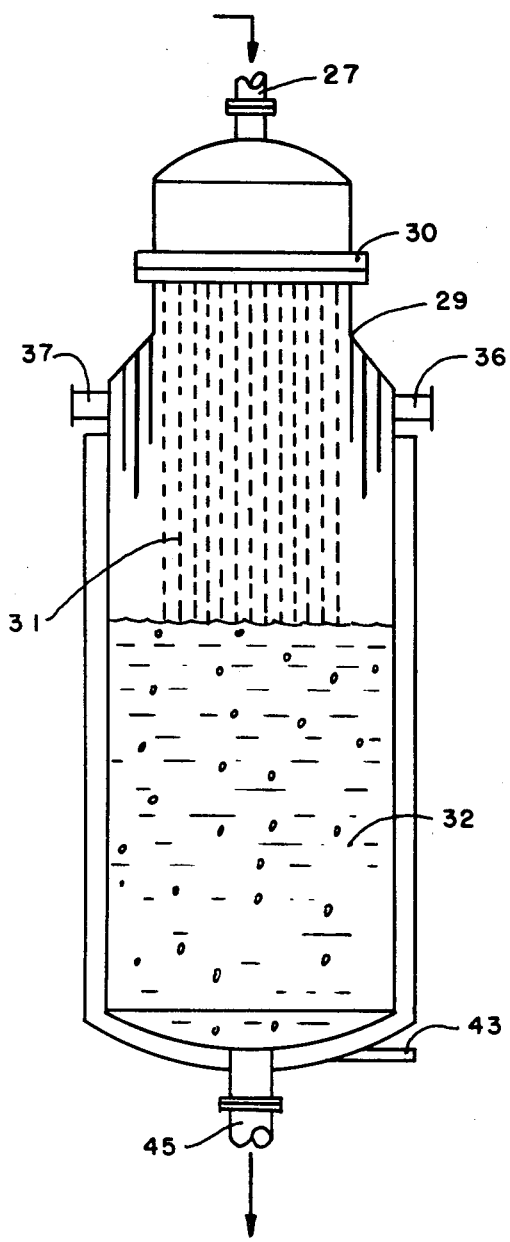
FIG. 2 is a schematical drawing which shows one mode of a vertical section through a vacuum demoisturizer apparatus adapted to carry out the present invention.

With reference to FIG. 2, the vacuum demoisturizer apparatus 29 is shown in more detail and operates as hereinbefore outlined. The reaction mixture or pre-polymer enters vacuum demoisturizer 29 through line 27 and is extruded through a die plate 30 having multiple apertures therein and sufficient to give to the pre-polymer an exposed surface area in the form of continuous or non-continuous strands 31 of at least about 0.2 square feet of pre-polymer per pound thereof and preferably an exposed surface area of about 2 to about 200 square feet of pre-polymer per pound thereof. The continuous or non-continuous strands 31 descend through the vacuum chamber of vacuum demoisturizer 29 to form a pool of polymer melt 32. The multiple baffle plates or entrainment separator means 34 are shown in relation to the surrounding environment and in more detail, of one mode each having a different length, and each, other than the innermost and outermost being foraminous wherein the volatiles are more readily removed. The molten polymer is withdrawn from pool 32 as shown and described in FIG. 1 for subsequent processing.

The following examples serve to illustrate the new and novel apparatus and process of the present invention and the advantages thereof but are not to be interpreted as limiting the invention to all details of the examples.

EXAMPLE 1

This example shows the unimpressive results obtained by using a dry sweep gas to establish an evaporative environment.

Seventeen grams of 50% hypophosphorus acid (0.009 mole percent based on the number of moles of lactam) and 1040 grams of sebacic acid (0.363 mole percent) are added to 160 kilograms of ε-caprolactam at 90° C. The mixture is charged to an autoclave and polymerized with agitation at 255° C. under 20 p.si.g. steam pressure for 3 hours, at the end of which time equilibrium is achieved. The resulting pre-polymer, which has F.A.R.V. of 22.0, is pumped from the autoclave to a 48-hole die plate located atop a column maintained at a temperature of 265° C. The molten pre-polymer is pumped through the die plate at a rate of about 0.2–20 pounds per hour per aperture, preferably about 0.5–2.5 pounds per hour per aperture. The resulting strands fall a distance of about 6 feet to form a pool at the bottom of the column. The pressure within the column is maintained at 770 mm. Hg by continually purging the column with a flow of desiccated, inert gas comprising by volume approximately 88% nitrogen and 12% carbon dioxide at the rate of 5 liters per minute. Polymer is pumped from the pool at the bottom of the column and extruded into a washer bath at a constant rate. The amount and residence time of polymer in the column are controlled by suitable adjustment of the rates of feed to and withdrawal from the column. In this way, the average residence time of polymer within the column is less than about one hour. The solidified polymer is pelletized, leached to a hot water-extractables content of 1.2% and dried. The F.A.R.V. of the polymer is only 26.7. The data for this example are summarized in Table I.

EXAMPLES 2–5

The following Examples 2–5 show the beneficial results which are unexpectedly obtained by modifying the process in Example 1 to employ a vacuum demoisturizer column in lieu of a column maintained at atmospheric or superatmospheric pressure.

The procedure followed in these examples is essentially the same as used in Example 1, except that in Examples 2, 3, 4 and 5, vacua of 400, 200, 100, and 50 mm. Hg, respectively, are employed within the demoisturizer column. No inert gas flow is used. The data for these examples are summarized in Table I.

EXAMPLES 6–10

The procedures of Examples 1–5 are repeated respectively in Examples 6–10 except that 750 grams (0.262 mole percent) of sebacic acid are employed. The data for these examples are summarized in Table I.

EXAMPLES 11–15

The procedure followed in these examples is essentially the same as used in Examples 1–5, respectively, except that no catalyst is employed. The data for these examples are summarized in Table II.

EXAMPLES 16–20

The procedures of Examples 11–15 are repeated respectively in Examples 16–20 except that 760 grams (0.262 mole percent) of sebacic acid are employed. The data for these examples are summarized in Table II.

EXAMPLE 21

An alternative method of vacuum demoisturizing having utility in this invention is to use a wiped thin film evaporating unit through which the mass is moved continuously in the form of a thin film. These mechanical thin film evaporating units are readily available commercially from vendors, such as, Contro, Inc., Petersham, Mass., and Luwa, Inc., of Charlotte, N.C., and will provide very high surface generation. For example, feeding the pre-polymer into the wiped thin film evaporator having a capacity of 1 square foot of heat transfer surface with temperature in the range of from 230° C. to 300° C. at pressures of less than 500 mm. Hg the following surface generation was obtained:

1200 r.p.m. and 20 lb./hour throughput gave 3,600 square feet/lb., 600 r.p.m. and 20 lb./hour throughput gave 1,800 square feet/lb., 1200 r.p.m. and 150 lb./hour throughput gave 480 square feet/lb., 600 r.p.m. and 150 lb./hour throughput gave 240 square feet/lb.

This alternative method yields results similarly beneficial to the vacuum demoisturizer system. The mechanical problems, however, are quite dissimilar.

TABLE I.—HYPOPHOSPHITE-CATALYSED POLYMERIZATION OF EPSILON-CAPROLACTAM WITH SEBACIC ACID CHAIN TERMINATION (EXAMPLES 1-10)

| Example [1] | Hypophosphorous acid feed conc. (mole percent) | Sebacic acid feed conc. (mole percent) | Flasher column vacuum (mm. Hg) | Flasher column feed viscosity (F.A.R.V.) [2] | Flasher column product viscosity (F.A.R.V.) [2] | Viscosity increase in flasher (F.A.R.V.) [2] | End-group analysis of flasher column product (equivalents/ $10^6$ grams) —COOH | —NH$_2$ | Hot-water extractables content of flasher column product (weight percent) |
|---|---|---|---|---|---|---|---|---|---|
| 1  | 0.009 | 0.363 | [3] 770 | 22.0 | 26.7 | 4.7  |    |    |     |
| 2  | 0.009 | 0.363 | 400     | 22.2 | 38.4 | 16.2 | 82 | 16 | 9.0 |
| 3  | 0.009 | 0.363 | 200     | 21.9 | 49.3 | 27.4 | 73 | 9  | 8.2 |
| 4  | 0.009 | 0.363 | 100     | 22.8 | 56.0 | 33.2 | 69 | 9  | 6.6 |
| 5  | 0.009 | 0.363 | 50      | 22.9 | 60.9 | 38.0 | 77 | 5  | 4.7 |
| 6  | 0.009 | 0.262 | [3] 760 | 23.9 | 41.8 | 17.9 |    |    |     |
| 7  | 0.009 | 0.262 | 400     | 24.8 | 51.8 | 33.0 | 75 | 22 | 9.2 |
| 8  | 0.009 | 0.262 | 200     | 24.6 | 71.5 | 46.9 | 68 | 18 | 9.6 |
| 9  | 0.009 | 0.262 | 100     | 25.8 | 84.2 | 58.4 | 69 | 10 | 6.3 |
| 10 | 0.009 | 0.262 | 50      | 26.6 |      |      | 54 | 7  |     |

See footnotes at end of Table II.

TABLE II.—NON-HYPOPHOSPHITE-CATALYSED POLYMERIZATION OF EPSILON-CAPROLACTAM (EXAMPLES 11-20)

| Example [1] | Hypophosphorous acid feed conc. (mole percent) | Sebacic acid feed conc. (mole percent) | Flasher column vacuum (mm. Hg) | Flasher column feed viscosity (F.A.R.V.) [2] | Flasher column product viscosity (F.A.R.V.) [2] | Viscosity increase in flasher (F.A.R.V.) [2] | End-group analysis of flasher column product (equivalents/ $10^6$ grams) —COOH | —NH$_2$ | Hot-water extractables content of flasher column product (weight percent) |
|---|---|---|---|---|---|---|---|---|---|
| 11 | 0.0 | 0.363 | [3] 770 | 22.4 | 24.5 | 2.1  |     |    |     |
| 12 | 0.0 | 0.363 | 400     | 23.3 | 36.9 | 13.6 | 58  | 14 | 8.9 |
| 13 | 0.0 | 0.363 | 200     | 22.8 | 39.7 | 16.9 | 74  | 16 | 8.2 |
| 14 | 0.0 | 0.363 | 100     | 21.8 | 38.2 | 16.4 | 132 | 43 | 7.0 |
| 15 | 0.0 | 0.363 | 50      | 21.8 | 39.3 | 17.5 | 89  | 44 | 3.9 |
| 16 | 0.0 | 0.262 | [3] 760 | 24.4 | 29.1 | 4.7  |     |    |     |
| 17 | 0.0 | 0.262 | 400     | 22.8 | 37.9 | 15.1 | 66  | 26 | 9.7 |
| 18 | 0.0 | 0.262 | 200     | 24.4 | 41.3 | 16.9 | 61  | 20 | 7.3 |
| 19 | 0.0 | 0.262 | 100     | 24.9 | 42.1 | 17.2 | 66  | 27 | 7.3 |
| 20 | 0.0 | 0.262 | 50      | 23.4 | 47.9 | 24.5 | 61  | 18 | 4.5 |

[1] In all examples, flasher column temperature=265° C.; residence time of reactants within flasher=60 minutes.
[2] F.A.R.V. is determined from measurements on washed and dried samples.
[3] Column pressures of one atmosphere and above are obtained by using inert sweep gas.

What is claimed is:

1. In a process of polymerizing fiber-forming ε-caprolactam wherein said ε-caprolactam is polymerized at an elevated temperature in the presence of water, a catalyst and a terminating agent to form a poly-caproamide polymerization mixture, the improvement comprising carrying out said polymerizing by imparting a surface area to the reaction mixture of at least about 0.2 square foot per pound thereof and subjecting said reacting mixture to a demoisturizing environment wherein the temperature is between about 230° C. and about 300° C. and the pressure is less than about 500 mm. Hg to increase the viscosity and to cause further polymerization of the reaction mixture.

2. The process of claim 1 wherein the catalyst is selected from the group consisting of hypophosphorus acid, alkali metal salts of hypophosphorus acid, alkaline earth metal salts of hypophosphorus acid and ammonium hypophosphite.

3. The process of claim 2 wherein the catalyst is employed in an amount between about 0.002 mole percent and about 0.03 mole percent.

4. The process of claim 1 wherein the surface area imparted to the reaction mixture is between about 2 to about 200 square feet per pound of reaction mixture.

5. The process of claim 1 wherein the temperature is between about 250° C. and about 285° C. and the pressure is between about 50 mm. Hg and about 400 mm. Hg.

6. The process of claim 1 wherein the reaction mixture is subjected to a demoisturizing environment of from about 4 linear feet to about 20 linear feet and to a residence time of from about 30 minutes to about 180 minutes.

7. The process of claim 6 wherein the reaction mixture is subjected to an evaporative environment of from about 6 feet to about 12 feet and to a residence time of from about 60 minutes to about 120 minutes.

8. The process of claim 1 wherein the pressure is between about 50 mm. Hg and 400 mm. Hg.

9. The process of claim 1 wherein the temperature is between about 255° C. and about 275° C. and the pressure is between about 50 mm. Hg and about 400 mm. Hg.

10. The process of claim 1 wherein the reaction mixture is subjected to an evaporative environment of from about 4 linear feet to about 20 linear feet and to a residence time of from about 30 minutes to about 180 minutes.

11. The process of claim 10 wherein the reaction mixture is subjected to an evaporative environment of from about 6 linear feet to about 12 linear feet and to a residence time of from about 60 minutes to about 120 minutes.

References Cited

UNITED STATES PATENTS 3,177,181  4/1965  Baum et al. _____ 260—78L
3,294,756  12/1966  Russell et al. _____ 260—78L WILLIAM SHORT, Primary Examiner
L. M. PHYNES, Assistant Examiner